(12) United States Patent
Mech

(10) Patent No.: US 8,280,703 B1
(45) Date of Patent: Oct. 2, 2012

(54) METHOD AND APPARATUS FOR CONTROLLING PROCEDURAL MODELS

(75) Inventor: Radomir Mech, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 869 days.

(21) Appl. No.: 12/356,421

(22) Filed: Jan. 20, 2009

(51) Int. Cl.
*G06F 7/60* (2006.01)

(52) U.S. Cl. .......................................... 703/2

(58) Field of Classification Search ............... 703/2
See application file for complete search history.

(56) References Cited

U.S. PATENT DOCUMENTS

2007/0174090 A1* 7/2007 Friedlander et al. ............ 705/3
2009/0058871 A1* 3/2009 Mech et al. .................... 345/582

\* cited by examiner

*Primary Examiner* — Dwin M Craig
*Assistant Examiner* — Andre Pierre Louis
(74) *Attorney, Agent, or Firm* — Robert C. Kowert; Meyertons, Hood, Kivlin, Kowert & Goetzel, P.C.

(57) ABSTRACT

Methods and apparatus are described that may be used interactively to control the synthesis of patterns via procedural modeling. In one method, a direct brush tool may be used to directly control placement of parts of a procedural model. An element of a pattern may be synthesized according to the procedural model along a curve from a start point to an end point. Other elements of the pattern may be synthesized along the curve according to the procedural model. In another method, an auto brush tool may be used to grow a procedural model automatically to a specified distance from the curve. A pattern may be synthesized according to the procedural model along the curve from a start point to an end point; the synthesis of the pattern by the procedural model may be constrained to a region defined by a specified distance from the curve.

40 Claims, 12 Drawing Sheets

---

Synthesize an element of a pattern according to a procedural model along a specified curve from a specified start point of the initial curve to a specified end point of the initial curve
200

Synthesize one or more other elements of the pattern along the curve according to the procedural model
202

Display the synthesized pattern
204

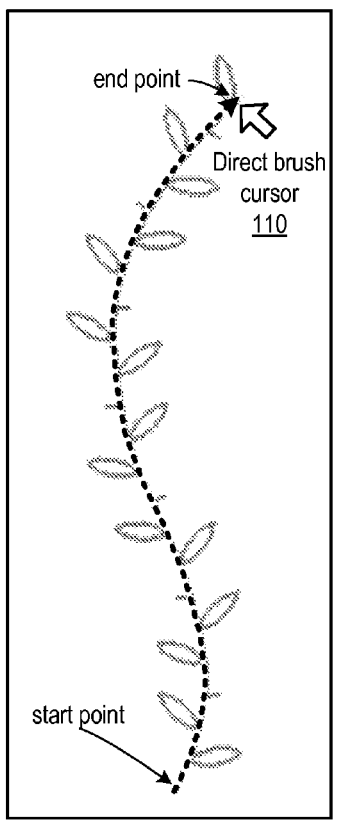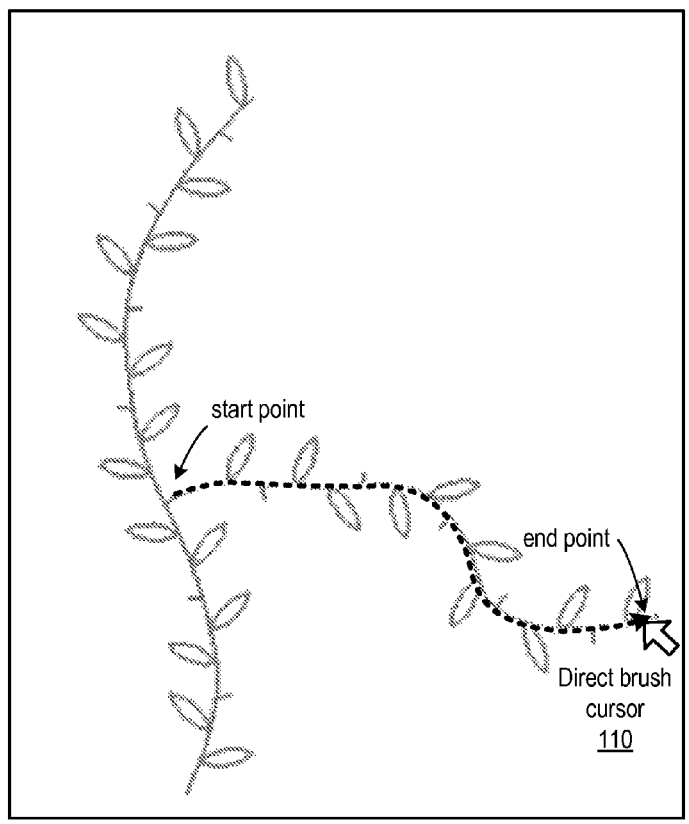
Figure 1A
Figure 1B

METHOD AND APPARATUS FOR CONTROLLING PROCEDURAL MODELS

BACKGROUND

Description of the Related Art

Element arrangements, or patterns, are ubiquitous in both man-made environments (e.g., tiles, building, façades, decorative art, etc.) and in the natural environment (e.g., trees, vines, honeycombs, flowers and flower petals, ballasts, pebble beaches, clouds, etc.). Synthesizing element arrangements or patterns is a useful tool in computer graphics, for example in texture creation and non-photorealistic rendering. Element arrangements have a large variation; some of them may have regular or near-regular features throughout, others are not locally regular but instead distribute irregular features uniformly (irregular uniform).

One technique for synthesizing general patterns is procedural modeling. Procedural modeling techniques deal with an element as a unit module. Procedural modeling systems create complex structures including one or more modules based on a set of rules and a set of parameters for the rules. A procedural modeling system starts from an initial feature, and progressively replaces and adds modules based on local generation rules. Conventionally, control of procedural models has been limited. Procedural modeling techniques typically require the developer or user to write scripts to define the local growth rules, which makes it difficult for novice users to control the resulting model. Interactions with and control of procedural models have conventionally been limited to editing the procedures (e.g., scripts written in L-systems or some other interpreted scripting language), moving sliders or other controls representing parameters of the model, creating curves representing the parameters over time, or manipulating the resultant image representing the production itself.

SUMMARY

Various embodiments of methods and apparatus for interactively controlling the synthesis of patterns using procedural models in computer graphics are described. Methods are described that may be used interactively to control the synthesis of patterns via procedural modeling. In one interactive procedural model control method, a user-controlled tool may be used interactively to directly control placement of parts or elements of a procedural model. This tool may be referred to as a direct brush or direct brush cursor. In another interactive procedural model control method, a tool may be used interactively to grow the procedural model automatically to a specified distance from the cursor position. This brush may be referred to as an auto brush or auto brush cursor. These two brushes may be used in combination; that is, a user may synthesize an initial pattern using either brush, and then add to or extend the pattern using the other brush.

In a method of controlling the synthesis of a pattern generated by a procedural model with a direct brush control, an element of a pattern may be automatically synthesized according to a procedural model along a specified curve from a specified start point of the curve to a specified end point of the curve. In one embodiment, input may be received from a cursor control device specifying the start point of the curve, the curve, and the end point of the curve. The curve may be specified by a movement of a cursor via the cursor control device from the start point to the end point. The curve may be an initial curve of a pattern being generated and thus may start at a user-specified seed point for the pattern, or may be a secondary curve of a pattern being generated that starts at some point on a displayed pattern. One or more other elements of the pattern may be automatically synthesized along the curve according to the procedural model. In one embodiment, a user may be able to specify (e.g., via a user interface or via editing a script) one or more elements to be synthesized along the curve according to the procedural model. The synthesized pattern may be displayed to a display device. In one embodiment, the pattern is synthesized and displayed while the cursor is moved via the cursor control device to generate the curve.

In a method for controlling the synthesis of a pattern generated by a procedural model with an auto brush control, a pattern may be synthesized according to a procedural model along a specified curve from a specified start point of the curve to a specified end point of the curve. The synthesis of the pattern by the procedural model may be constrained along the curve to a region defined by a specified distance from the curve. In one embodiment, input may be received from a cursor control device specifying the start point of the curve, the curve, and the end point of the curve. The curve may be specified by a movement of a cursor via the cursor control device from the start point to the end point. The curve may be an initial curve of a pattern being generated and thus may start at a user-specified seed point for the pattern, or may be a secondary curve of a pattern being generated that starts at some point on a displayed pattern. The synthesized pattern may be displayed to a display device. In one embodiment, the pattern is synthesized and displayed while the cursor is moved via the cursor control device to generate the curve.

Embodiments of the methods for interactively controlling the synthesis of patterns using procedural models may be implemented in graphics applications, for example as a pattern synthesis module provided in a stand-alone graphics application or as a pattern synthesis module of a graphics application or graphics library. Embodiments of a pattern synthesis module may implement one or both of the direct brush method and the auto brush method, and may optionally implement an eraser brush method that allows the user to interactively trim previously synthesized portions of a displayed pattern.

BRIEF DESCRIPTION OF THE DRAWINGS

FIG. 1A illustrates synthesizing an initial pattern using the direct brush cursor to control the pattern synthesis, according to one embodiment.

FIGS. 1B and 1C illustrate extending the pattern generated in FIG. 1A using the direct brush, according to one embodiment.

Figure 1C:
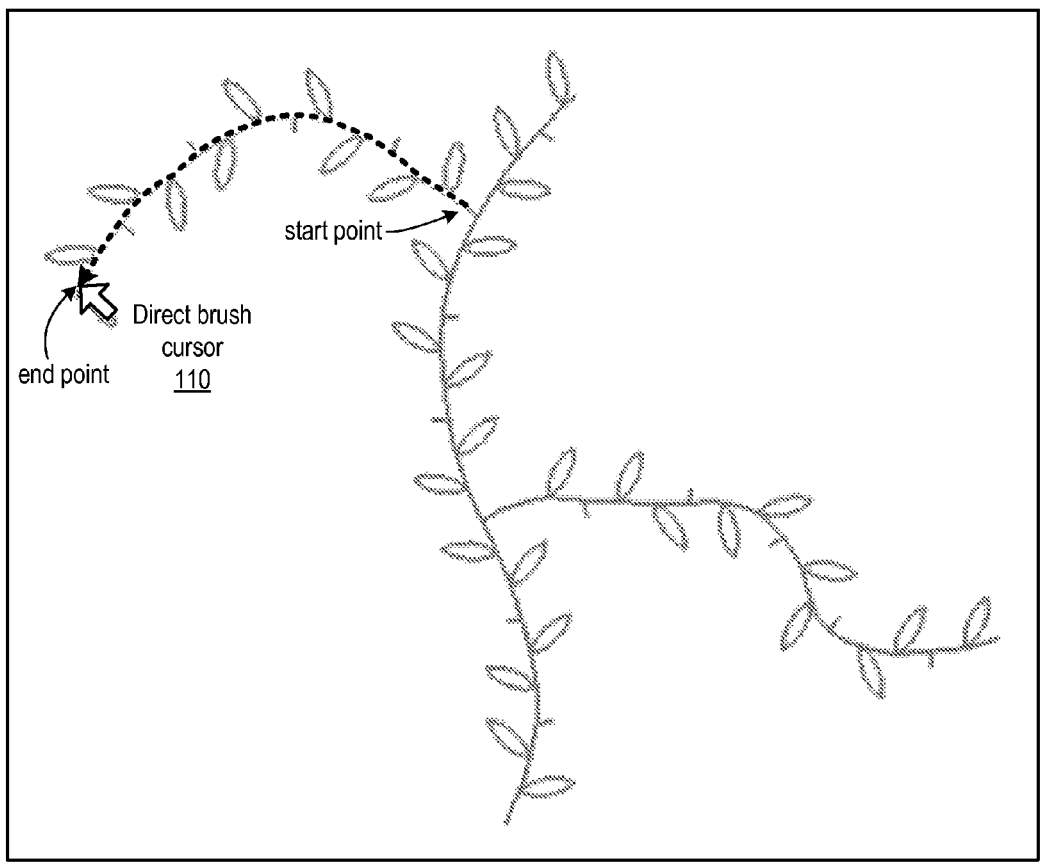

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for interactively controlling the synthesis of patterns using procedural models in computer graphics are described. Methods are described that may be used interactively to control the synthesis of patterns via procedural modeling. In one interactive procedural model control method, a user-controlled tool, referred to herein as a brush or brush cursor, may be used interactively to directly control the placement of parts or elements of a procedural model. This brush may be referred to as a direct brush or direct brush cursor. In another interactive procedural model control method, a brush may be used interactively to grow the procedural model automatically to a specified distance from the cursor position. This brush may be referred to as an auto brush or auto brush cursor. These two brushes may be used in combination; that is, a user may synthesize an initial pattern using either brush, and then add to or extend the pattern using the other brush. Also described is an interactive procedural model control method that uses an eraser cursor to interactively remove portions of a pattern generated previously by one or both of the direct and auto brushes. These methods give the user more control during the synthesis of procedural patterns than is found in conventional procedural modeling systems.

Figure 7:
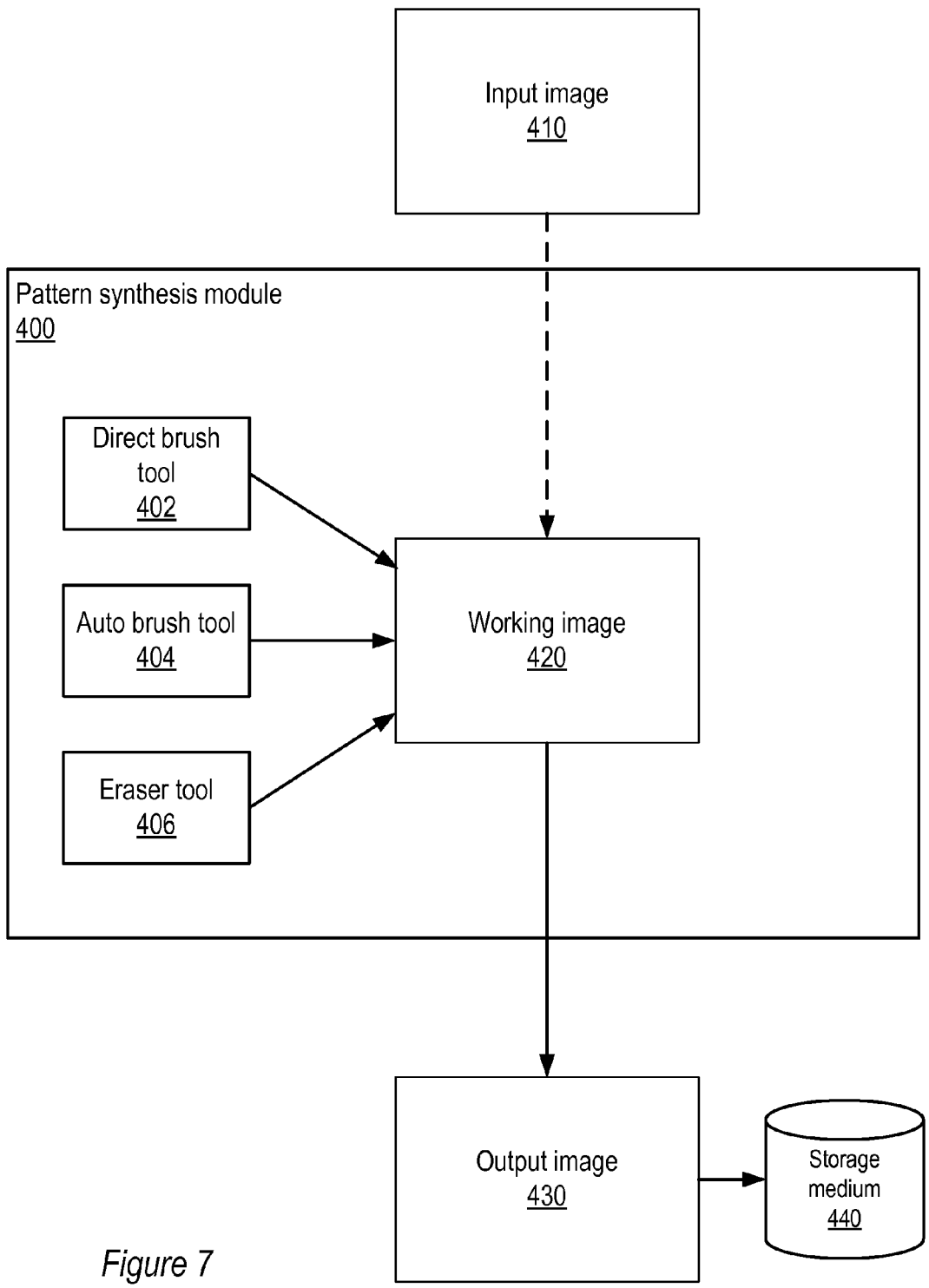
FIG. 7 illustrates a pattern synthesis module according to one embodiment.
Figure 8:
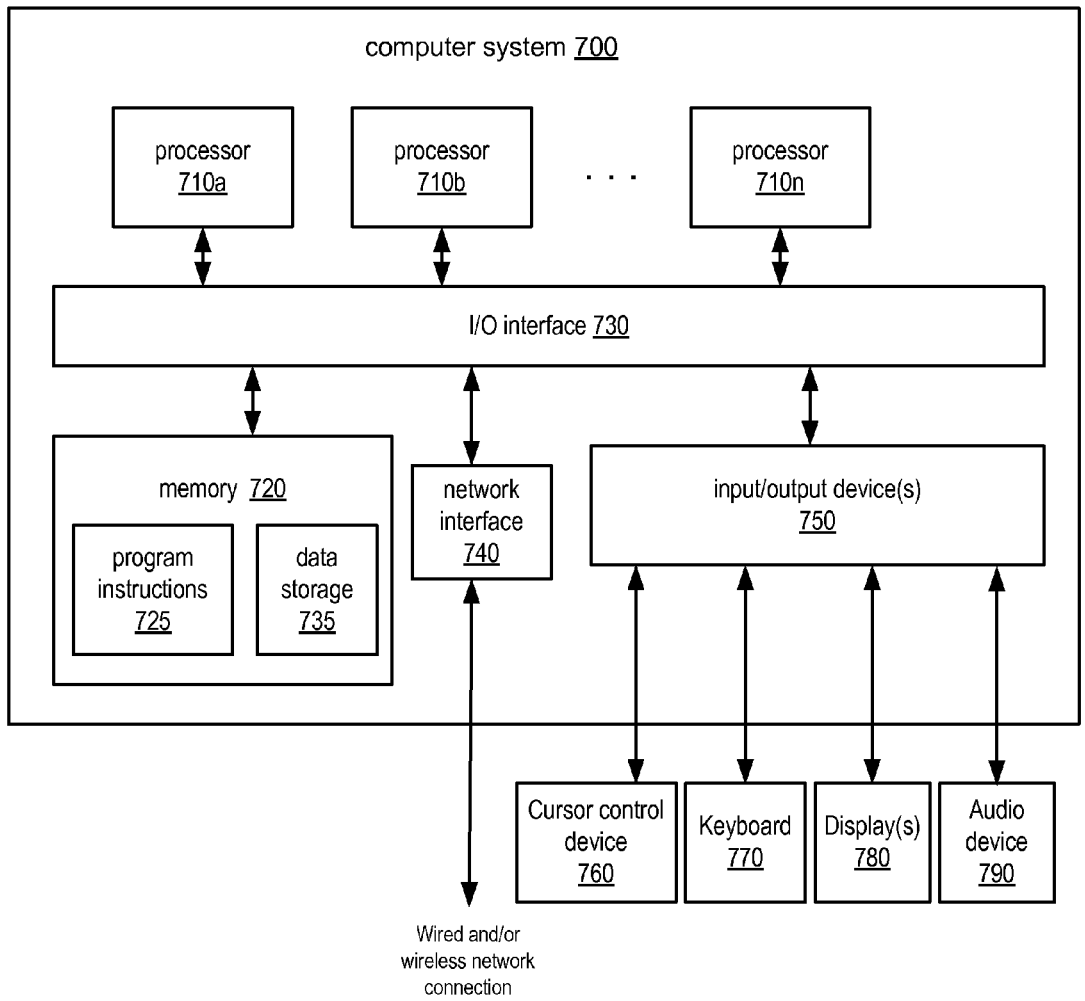
FIG. 8 illustrates an example computer system that may be used in embodiments.

Embodiments of the methods for interactively controlling the synthesis of patterns using procedural models may be implemented in graphics applications, for example as a pattern synthesis module provided in a stand-alone graphics application or as a pattern synthesis module of a graphics application or graphics library. Examples of graphics applications in which embodiments may be implemented may include, but are not limited to, painting, publishing, photography, games, animation, and/or other applications. Embodiments of a pattern synthesis module may implement one or both of the direct brush method and the auto brush method, and may optionally implement the eraser brush method. FIG. 7 illustrates an example embodiment of a pattern synthesis module. FIG. 8 illustrates an example of a computer system in which embodiments of a pattern synthesis module or components thereof may be implemented.

A procedural model that synthesizes a branching vine, leaf and flower pattern (see, e.g., FIG. 2) is used herein as an example of a procedural model that may be synthesized and modified using the interactive procedural model control methods described herein. The procedural model (e.g., written as one or more scripts) controls the placement of model elements (e.g., branches, forks, twigs, leaves and flowers) according to one or more rules specified in the model when synthesizing the pattern. It is to be noted that this procedural model is used for illustrative purposes and is not intended to be limiting, and that embodiments may be used to control the synthesis of any procedural model.

Conventionally, to synthesize a pattern according to a procedural model, a user would modify one or more parameters of the procedural model, for example using a slider control, and then click on the screen to define the starting point from which the pattern defined by the procedural model is to grow. The procedural model would then grow the pattern without interactive control by the user. Embodiments provide methods and apparatus whereby a user may interactively control the synthesis of the pattern by the procedural model, as described below.

FIGS. 1A through 1C illustrate functionality of a direct brush in controlling the synthesis of a pattern according to a procedural model, according to one embodiment. A procedural model that synthesizes a branching vine, leaf and flower pattern is used as an example. Using the direct brush to synthesize a pattern, the cursor position is used to directly specify the position of one or more elements of the procedural model. In the case of the example model, with the direct brush the user can directly draw a branch of the pattern using the cursor control device (e.g., a mouse). The procedural model may be used to procedurally place leaves along the drawn branch and short lines or twigs indicating where new branches may be placed extending from the initial branch. The user may then add new branches at the twigs. Thus, the direct brush method overrides some of the rules of the procedural model to directly place elements on the user-drawn curve, but may use some of the rules of the procedural model to place one or more other elements along the curve.

FIG. 1A illustrates synthesizing an initial pattern using the direct brush cursor to control the pattern, according to one embodiment. In this embodiment, the user may move the direct brush cursor 110 to a desired starting position or start point (indicated by "start point" in FIG. 1A), activate the direct brush if necessary (e.g., by pressing the left mouse button, or by some other method), and move the cursor using the cursor control device to draw a curve representing the desired path of the element (in this example, a branch). In FIG. 1A, the dashed line indicates the path that the direct cursor 110 followed under user control from the start point to its currently indicated position (the end point) to generate the desired curve. Note that the generated curve may be, but is not necessarily, a straight line. The user may deactivate the direct brush if necessary (e.g., by releasing the left mouse button, or by some other method) when the direct brush cursor 110 is at a desired end point or position. In FIG. 1A, the current position of the cursor 110 is the end point or position. In one embodiment, the procedural model may be configured to generate at least some other elements of the pattern along the path of the element. Thus, the direct brush may be used to synthesize a pattern including only one, a subset of, or all of the elements of the pattern. In this example, the procedural model generates two alternating leaves, followed by a twig, two more alternating leaves, followed by a twig on the opposite side of the primary branch from the first twig, and so on, extending from the primary branch (the branch indicated by the dashed line). In this example, the generated pattern does not include forks in the branch or flowers. In one embodiment, the pattern is drawn along the path while the user is moving the cursor via the cursor control. In another embodiment, or alternatively, the pattern may not be drawn or may only be partially drawn until after the user completes the path. It is to be noted that the pattern generated is an example, and that other combinations of elements in the pattern or other patterns may be generated using the direct brush.

FIGS. 1B and 1C illustrate extending the pattern generated in FIG. 1A using the direct brush, according to one embodiment. In both FIGS. 1B and 1C, the direct brush cursor 110 is moved by the user to select a twig on the primary branch (indicated by "start point" in both Figures), activated, and moved by the user using the cursor control device along the curves or paths indicated by the dashed lines to the current position shown (i.e., the end point or position) to draw new or secondary branches extending from the primary branch and ending at the end point or position. The direct brush cursor may be used to extend new branches from the twigs on the secondary branches as well.

Figure 2:
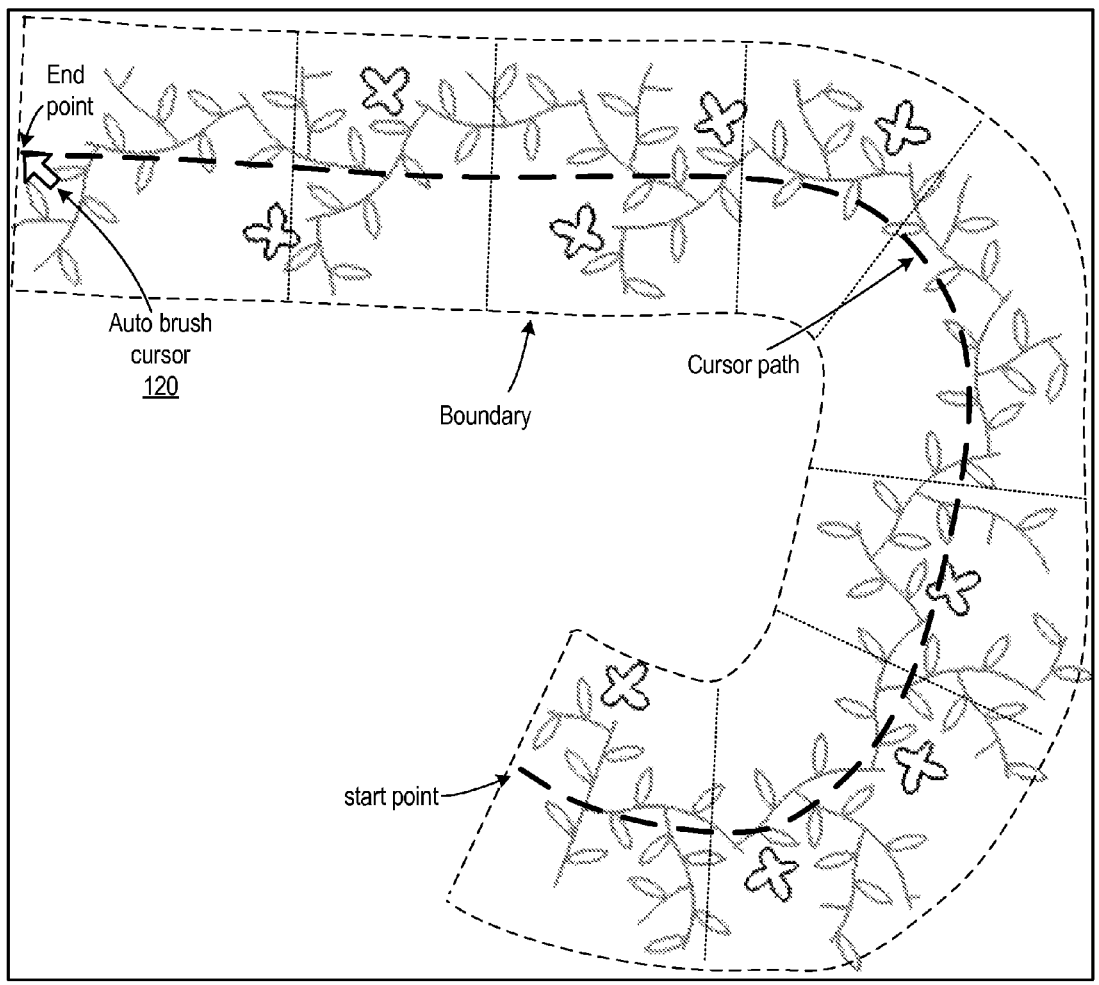
FIGS. 2 and 3 illustrate functionality of an auto brush in controlling the synthesis of a pattern according to a procedural model, according to one embodiment.

FIG. 2 illustrates functionality of an auto brush in controlling the synthesis of a pattern according to a procedural model, according to one embodiment. A procedural model that synthesizes a branching vine, leaf and flower pattern is used as an example. Using the auto brush to synthesize a pattern, the cursor position is used to specify a curve or path along which the procedural model is to synthesize the pattern. However, unlike the direct brush, an element is not directly specified by the user-specified path. Instead, the procedural model is constrained to synthesize the pattern within a specified distance, i.e. within a boundary region, of the drawn curve or path. In addition, while the procedural model with the direct brush may be used to synthesize a subset of the elements of the pattern, all pattern elements may be synthesized according to the rules of the procedural model when using the auto brush. In the case of the example model, with the auto brush the user draws a curve or path using the cursor control device (e.g., a mouse). The procedural model places pattern elements (branches, forks, leaves, twigs and flowers) within a specified boundary region around the user-specified curve or path according to the rules of the procedural model. The specified boundary region is determined by the specified distance.

In FIG. 2, the user may move the auto brush cursor 120 to a desired starting position or start point (indicated by "start point" in FIG. 2), activate the auto brush if necessary (e.g., by pressing the left mouse button, or by some other method), and move the cursor using the cursor control device to draw the desired curve or path. In FIG. 2, the heavy dashed line indicates the approximate path that the auto brush cursor 120 followed under user control from the start point to its currently indicated position (the end point). The user may deactivate the auto brush if necessary (e.g., by releasing the left mouse button, or by some other method) when the auto brush cursor 120 is at the desired end point or position. In the Figure, the current position of the cursor 120 is the end point of the path, or the end position. The lighter dashed lines indicate an approximation of the boundary region that constrains the procedural model. The procedural model generates the pattern around the path and constrained by the boundary (i.e., within a specified distance of the curve or path). In one embodiment, the pattern is drawn within the boundary along the path while the user is moving the cursor via the cursor control. In another embodiment, or alternatively, the pattern may not be drawn until after the user completes the curve or path. It is to be noted that the pattern generated is an example, and that other patterns may be generated using the auto brush.

Figure 3:
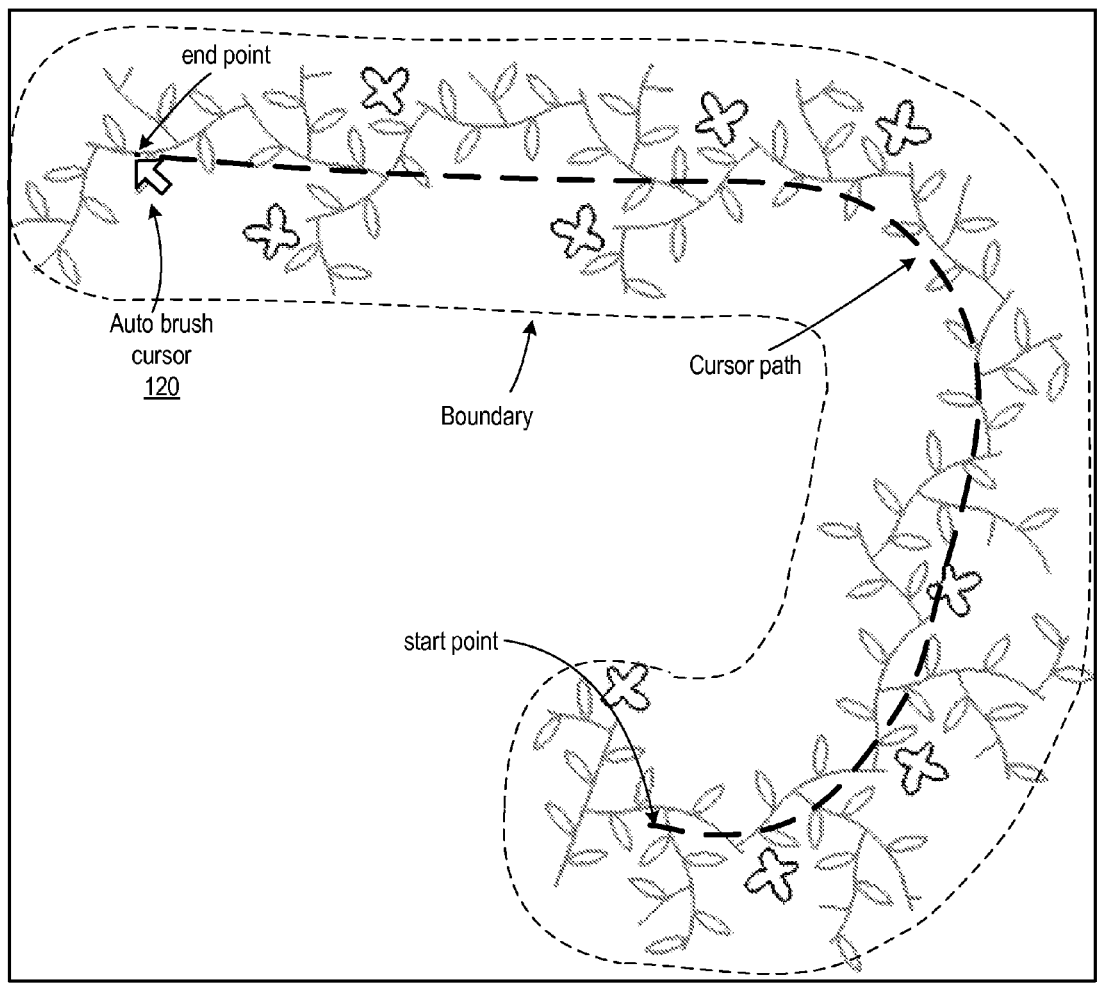

While FIG. 2 shows the constraint as perpendicular to the start point of the curve and to the end point of the curve indicated by the current position of the cursor, and thus shows the ends of the constraint regions as flat or "squared off" and the pattern not extending beyond (i.e., constrained by) lines perpendicular to the ends of the curve or path, in one embodiment a radial constraint region may be used. In this embodiment, instead of being flat at the ends, the constraint region would be rounded at the ends, with the radius being the distance from the path used to define the boundary region. An approximation of such a boundary region with rounded ends and a corresponding path used to generate the boundary is illustrated in FIG. 3.

Thus, the direct brush may be used to constrain the synthesis of an element of a pattern along a user-specified curve or path. The procedural model may add one or more other elements along the curve. The auto brush may be used to constrain the synthesis of a pattern to within a specified distance of a user-specified curve or path. In one embodiment, modification of a procedural model may be necessary to support the pattern synthesis control functionality provided by the brushes. For example, a script or scripts that implement a procedural model may need to be written or modified to support the pattern synthesis control provided by one or both of the direct brush and the auto brush.

In one embodiment, the direct brush illustrated in FIGS. 1A through 1C and the auto brush illustrated in FIG. 2 may be used in combination to synthesize a pattern. For an example of a pattern in which both brushes were used to control synthesis of portions of the pattern, see FIG. 4D. Patterns generated according to the methods illustrated in FIGS. 1A through 1C and FIG. 2 may be stored in an electronic file which may be stored to a storage device, printed, transmitted via a network or other means, etc. Other procedurally-generated patterns and/or other graphical or textual content may be included in the electronic file.

A graphics application that implements a pattern synthesis module including the direct brush and/or the auto brush may provide a user interface including one or more user interface elements whereby a user may select and control the use of either or both brushes to synthesize patterns according to a procedural model. The user interface to the pattern synthesis module may provide other user interface elements for controlling various aspects of the procedural model and/or for performing other graphics-related tasks. FIGS. 4A through 4E illustrate an example user interface for a pattern synthesis module according to one embodiment. This user interface is provided as an example of a possible implementation, and is not intended to be limiting.

Figure 4A:
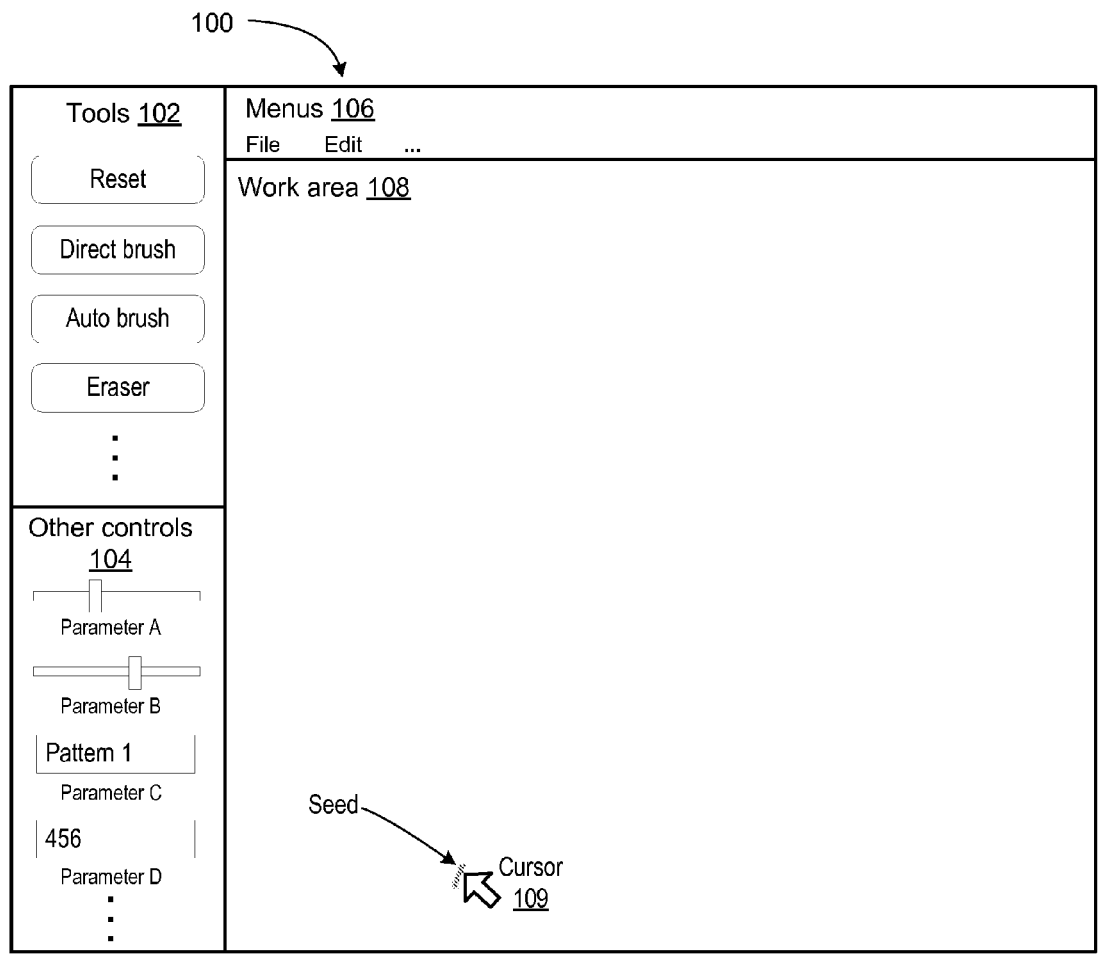
FIG. 4A shows an example display 100 on which a user interface to a pattern synthesis module may be implemented, according to one embodiment.

FIG. 4A shows an example display 100 on which a user interface to a pattern synthesis module may be implemented, according to one embodiment. In this example user interface, the display is divided into four regions or areas: tools 102, other controls 104, menus 106, and work area 108. Tools 102 may include one or more user-selectable user interface elements. In this example interface, it is this area that contains the user interface elements that a user may select to select one or both of the direct brush and the auto brush. Other optional tools may be selected as well, such as an eraser or reset function, which will be explained below. While FIG. 4A shows the elements in tools 102 as buttons, other types of user interface elements, such as pop-up menus, may be used to select from among one or more tools in various embodiments. As noted above, the reset and eraser tools are optional, and thus may or may not be included on the user interface in various embodiments. Various embodiments may include other tools not shown as well, such as an "undo" tool that undoes the most recent user action in the work area 108. Also, while FIG. 4A shows both the direct brush tool and the auto brush tool available on the user interface, various embodiments may include only one of the tools on a user interface; thus, a display and user interface may be provided in some implementations that includes either the direct brush tool or the auto brush tool, but not both.

Other controls 104 may include one or more user-modifiable controls, such as slider bars, dials, pop-up menus, alphanumeric text entry boxes, etc. In this example interface, it is this area that contains user interface elements that a user may use to modify various settings or parameters of the procedural model and/or of the direct brush and auto brush. For example, the box labeled "Parameter C" in this example display 100 may be used to select from among multiple procedural models that the user may have available. Other methods of selecting a procedural model may be used in various embodiments. As another example, one of the user interface elements in 104 may be used to specify a distance from the curve or path drawn with the auto brush cursor; this distance is used to constrain the procedural model as it synthesized the pattern. Other methods of specifying the distance from the auto brush cursor path may be used in various embodiments. One or more procedural model-specific parameters may be displayed and/or modified using one or more of the controls in 104 in some embodiments. Other methods of specifying the procedural model-specific parameters may be used in various embodiments.

Menus 106 may include one or more menus, for example menus used to navigate to other displays in the graphics application, open files, print or save files, undo/redo actions, and so on. Work area 108 is the area in which a pattern is to be synthesized.

Work area 108 may display a portion or all of a new work to which a pattern or patterns is to be added using a procedural model or models, or a portion or all of a previously existing work being modified by adding a pattern or patterns using a procedural model or models. FIG. 4A shows a user-specified starting position, or seed, in work area 108 for a pattern to be generated. In one embodiment, to generate the seed, the user may move the cursor 109 to the desired position on work area 108 and click the cursor control button, e.g. a mouse button. Other methods for specifying a seed location may be used in various embodiments. While FIG. 4A only shows the seed, other graphical or textual elements may be displayed in work area 108.

Figure 4B:
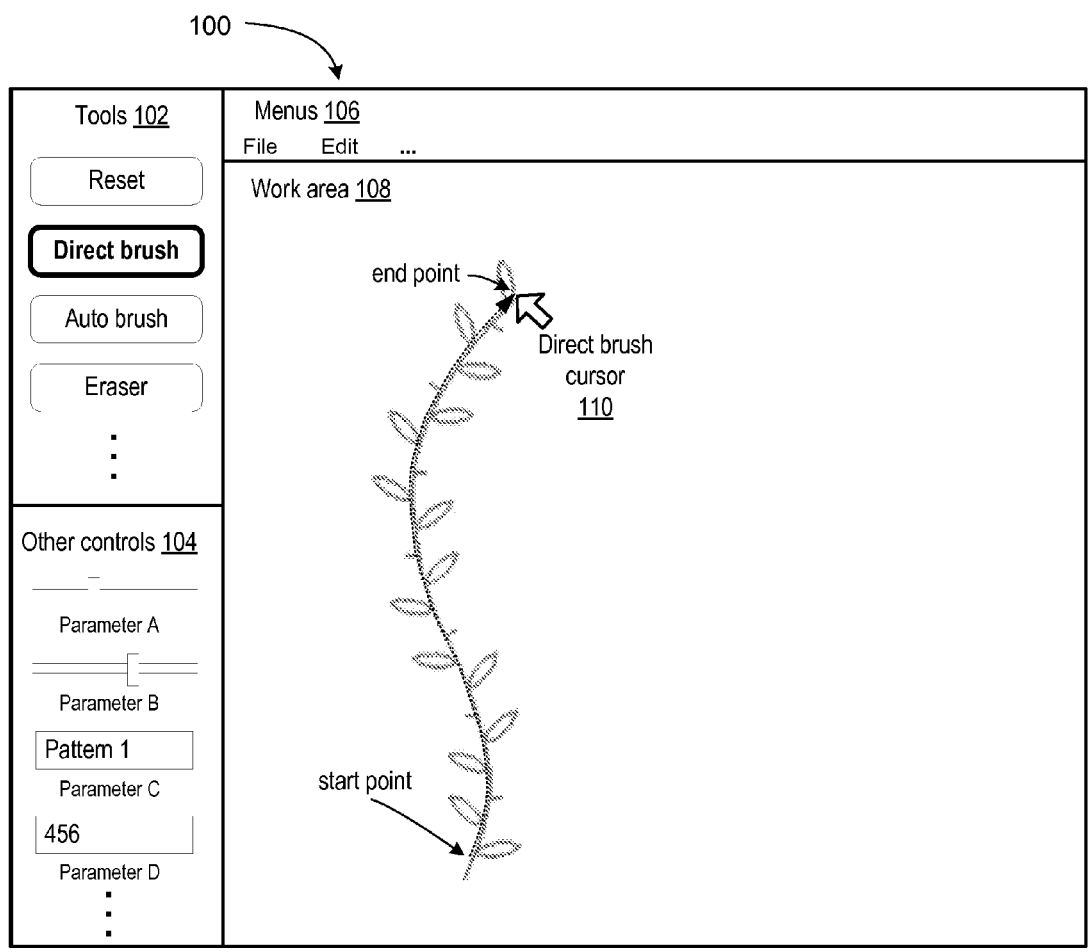
FIG. 4B illustrates synthesizing an initial pattern using the direct brush cursor to control the pattern via the user interface illustrated in FIG. 4A, according to one embodiment.

In FIGS. 4B through 4E, user selection of a particular tool in tools 104 is indicated by bold lines and text. FIG. 4B illustrates synthesizing an initial pattern using the direct brush cursor to control the pattern via the user interface illustrated in FIG. 4A, according to one embodiment. In this example, the user first selects the direct brush tool element in tools 102, for example by moving the cursor over the tool and clicking Other methods for selecting a tool from tools 102 may be used in various embodiments. While FIG. 4A illustrates synthesizing an initial pattern starting at the seed using the direct brush tool, it is to be noted that the auto brush tool may also be used to synthesize an initial pattern starting at the seed.

The user may move the direct brush cursor 110 to the seed (indicated by "start" in FIG. 4B), activate the direct brush if necessary (e.g., by pressing the left mouse button, or by some other method), and move the cursor using the cursor control device to draw the desired curve or path on which the element is to be synthesized (in this example, to form a branch). In FIG. 4B, the dotted line indicates the path that the direct cursor 110 followed under user control from the start to its currently indicated position to generate the curve. In one embodiment, the procedural model may be configured to generate at least some other elements of the pattern along the curve. In this example, the procedural model generates two alternating leaves, followed by a twig, two more alternating leaves, followed by a twig on the opposite side of the primary branch from the first twig, and so on, extending from the primary curve (the branch indicated by the dashed line). In one embodiment, the pattern is drawn along the path while the user is moving the cursor via the cursor control. In another embodiment, or alternatively, the pattern may not be drawn or may only be partially drawn until after the user completes the path. It is to be noted that the pattern generated is an example, and that other patterns may be generated using the direct brush.

Figure 4C:
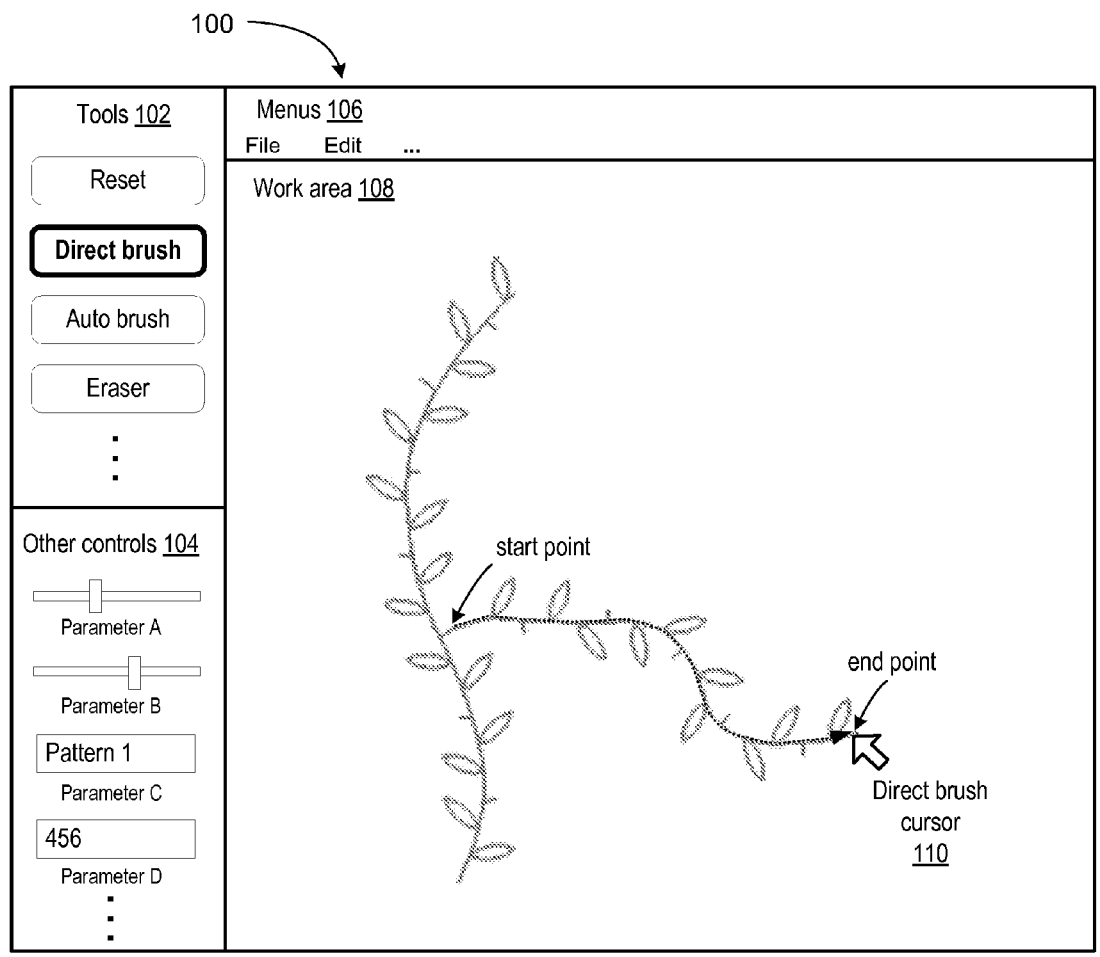
FIG. 4C illustrates extending a generated pattern using the direct brush, according to one embodiment.

FIG. 4C illustrates extending the pattern generated in FIG. 4B using the direct brush, according to one embodiment. In FIG. 4C, the direct brush cursor 110 is moved by the user to select a twig on the primary branch (indicated by "start point" in FIG. 4C), activated, and moved by the user along the path indicated by the dotted line using the cursor control device to the current position shown to draw a new or secondary branch extending from the primary branch. The direct brush cursor may be used to extend new branches from the twigs on the primary or secondary branches.

Figure 4D:
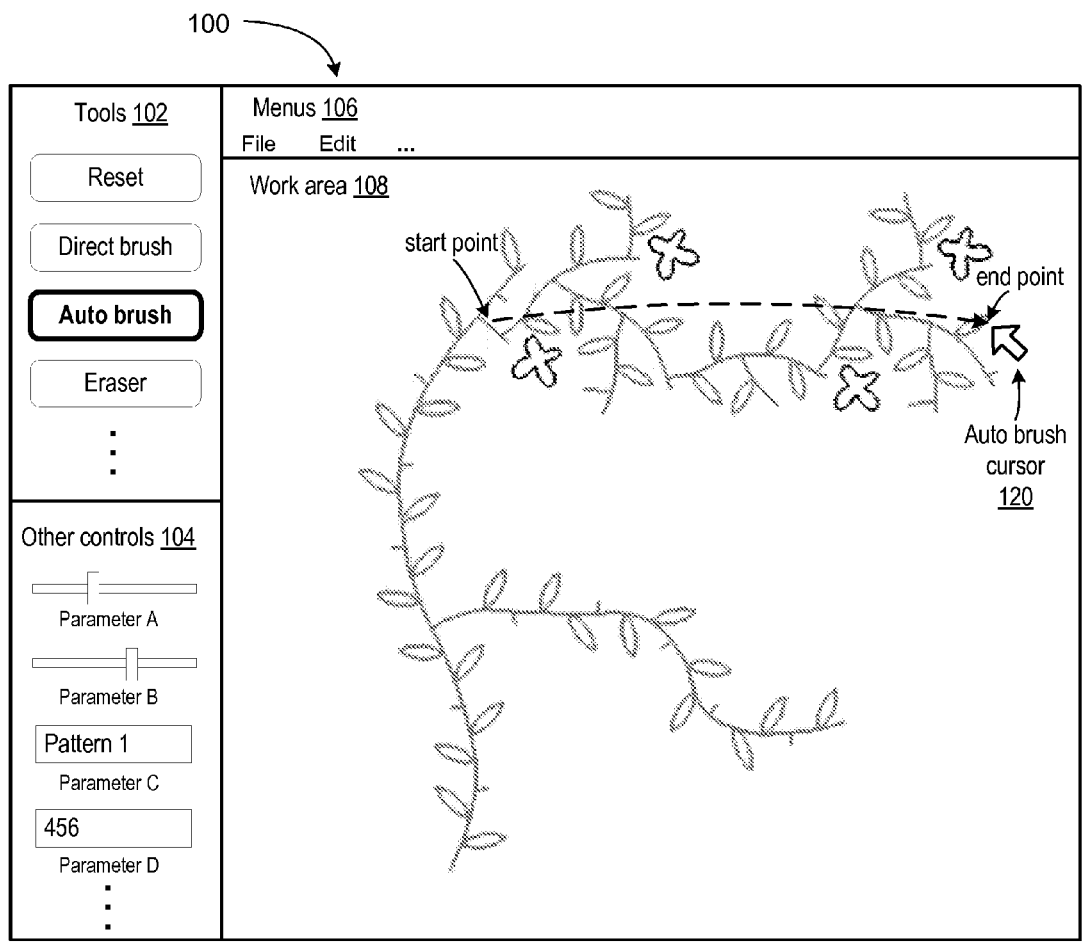
FIG. 4D illustrates extending a generated pattern using the auto brush, according to one embodiment.

FIG. 4D illustrates extending the pattern generated in FIGS. 4B and 4C using the auto brush, according to one embodiment. In this example, the user first selects the auto brush tool element in tools 102, for example by moving the cursor over the tool and clicking. Other methods for selecting a tool from tools 102 may be used in various embodiments. In one embodiment, the user may also specify or modify the distance from the path to be used to constrain the procedural model, for example via user modification of one of the controls in controls 104, or by some other method. The user may then move the auto brush cursor 120 to a desired starting position at one of the twigs on the pattern (indicated by "start point" in FIG. 2), activate the auto brush if necessary (e.g., by pressing the left mouse button, or by some other method), and move the cursor using the cursor control device to draw the desired path. In FIG. 4D, the dashed line indicates the approximate path that the auto brush cursor 120 followed under user control from the start to its currently indicated position. The procedural model generates the pattern around the path, constrained by a boundary (i.e., within a specified distance of the path). In one embodiment, the pattern is drawn within the boundary along the path while the user is moving the cursor via the cursor control. In another embodiment, or alternatively, the pattern may not be drawn until after the user completes the path. It is to be noted that the pattern generated is an example, and that other patterns may be generated using the auto brush.

In one embodiment, the specified distance may be fixed, for example by setting a parameter in other controls 104. In one embodiment, the specified distance may be dynamically changed by user input while the curve is being drawn. For example, in one embodiment, the user may apply more or less pressure to a cursor control device button to increase or decrease the specified distance while drawing the curve. Other methods for dynamically changing the specified distance may be used in embodiments.

Figure 4E:
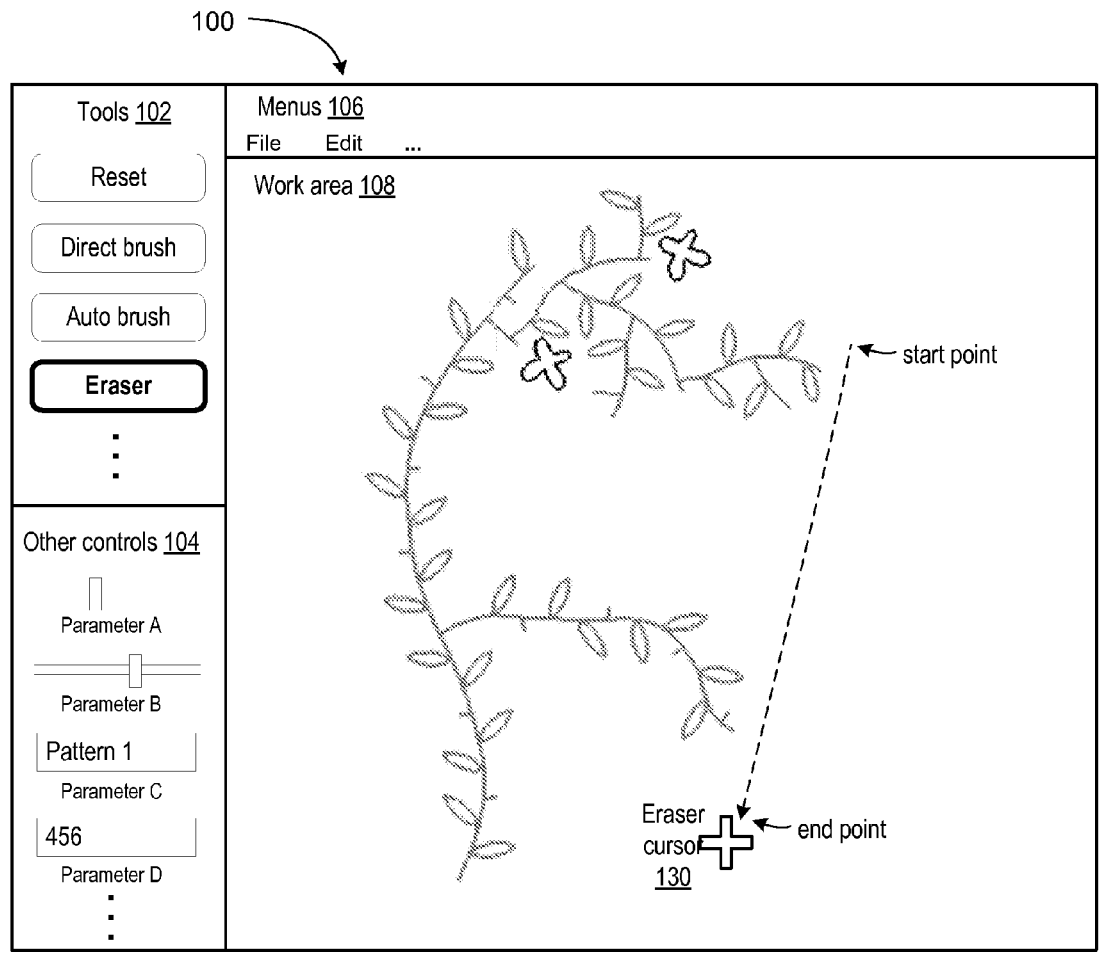
FIG. 4E illustrates an eraser tool that may be used to erase portions of a generated pattern, according to one embodiment.

FIG. 4E illustrates an eraser tool that may be used to erase portions of the pattern generated in FIGS. 4B through 4D, according to one embodiment. In this example, the user first selects the eraser tool element in tools 102, for example by moving the cursor over the tool and clicking. Other methods for selecting a tool from tools 102 may be used in various embodiments. In one embodiment, the user may also specify or modify parameters of the eraser, such as eraser width, for example via user modification of one of the controls in controls 104, or by some other method. The user may then move the eraser cursor 130 to a desired starting position in work area 108, activate the eraser if necessary (e.g., by pressing the left mouse button, or by some other method), and move the cursor using the cursor control device to draw a path. In FIG. 4E, the dashed line indicates the approximate path that the eraser cursor 130 followed under user control from the indicated start point or position to its currently indicated position (the end point). As indicated in FIG. 4E, portions of the pattern shown in FIG. 4D that are farther from the initial seed location of the pattern shown in FIG. 4A and are thus trimmed by the eraser cursor 130 and are deleted from the work area 108. Thus, the pattern (any pattern, not just the example pattern) may be viewed as a bush-like or tree-like structure that starts at the seed location and extends outward, and the eraser tool may be used to trim the outer branches of the bush or tree structure.

While the action of the reset user interface element shown in FIGS. 4A through 4E is not shown, in one embodiment, the user may select the reset user interface element to reset the work area 108 to the initial state shown in FIG. 4A. In addition, one embodiment may include an "undo" user interface element that undoes the last user action in the work area. For example, if an undo user interface element was selected in FIG. 4E, the result would be to restore the work area to the state shown in FIG. 4D. Likewise, if an undo user interface element was selected in FIG. 4D, the result would be to restore the work area to the state shown in FIG. 4C.

At any point during the work illustrated in FIGS. 4A through 4E, or afterwards, the user may save the synthesized pattern displayed in work area 108 to a file on a local or network storage device, print the work area 108, or perform other typical file or various other functions on the displayed work or current work file. For example, one or more of the menus in menus 106 area may include user interface elements that may be selected to save, print or otherwise process the work area or current work file.

While FIGS. 1A through 1C, FIG. 2, FIG. 3, and FIGS. 4A through 4E show open-ended curves, in some embodiments, the direct brush tool and the auto brush tool may be used to draw closed curves. Note that curves drawn with either tool may include straight lines, curved lines, lines with angles, closed curves, or geometric shapes (e.g., triangles, rectangles, circles, etc.) Generally, any open or closed shape may be drawn using either of the brushes, and the pattern may be synthesized along the curve according to the procedural model and the currently specified parameters for the procedural model.

Figure 5:
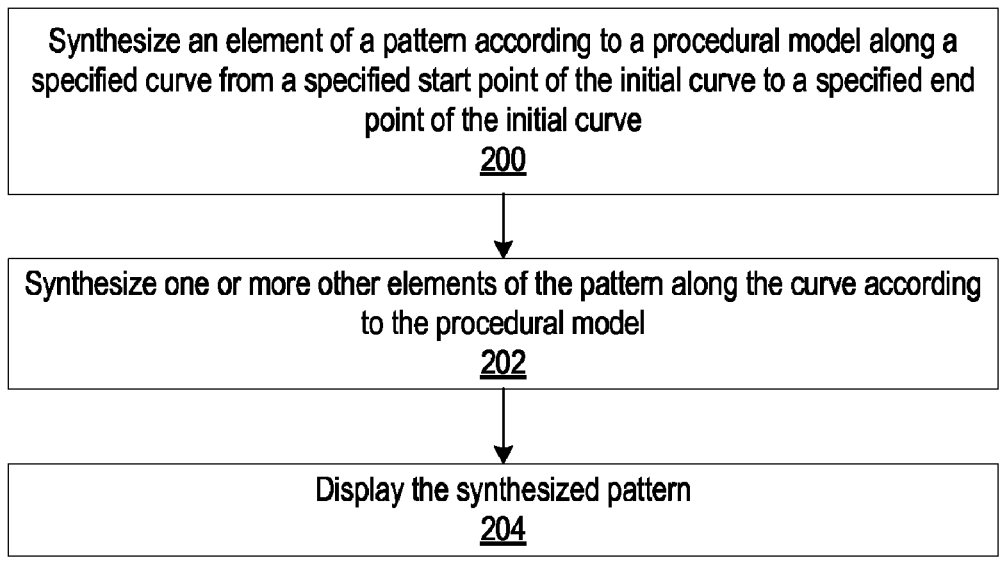
FIG. 5 is a flowchart of a method of controlling the synthesis of a pattern generated by a procedural model with a direct brush control, according to one embodiment.

FIG. 5 is a flowchart of a method for controlling the synthesis of a pattern generated by a procedural model with a direct brush control, according to one embodiment. As indicated at 200, an element of a pattern may be automatically synthesized according to a procedural model along a specified curve from a specified start point of the curve to a specified end point of the curve. In one embodiment, input may be received from a cursor control device specifying the start point of the curve, the curve, and the end point of the curve. The curve may be specified by a movement of a cursor via the cursor control device from the start point to the end point. The curve may be an initial curve of a pattern being generated and thus may start at a seed point, or may be a secondary curve of a pattern being generated that starts at some point on a displayed pattern.

As indicated at 202, one or more other elements of the pattern may be automatically synthesized along the curve according to the procedural model. In one embodiment, a user may be able to specify (e.g., via a user interface or via editing a script) one or more elements to be automatically synthesized along the curve according to the procedural model.

As indicated at 204, the synthesized pattern may be displayed to a display device. In one embodiment, the pattern is synthesized and displayed while the cursor is moved via the cursor control device to generate the curve.

Figure 6:
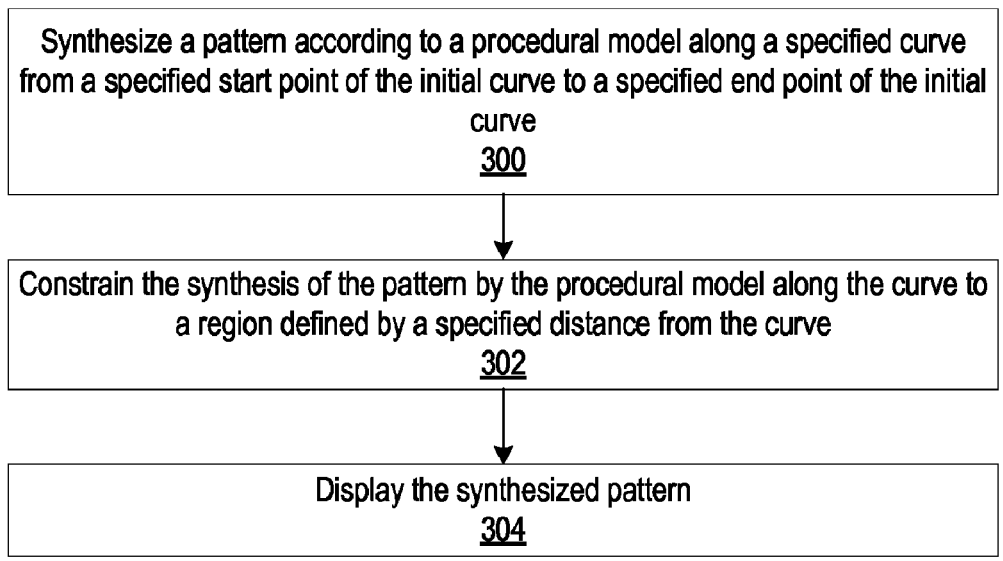
FIG. 6 is a flowchart of a method of controlling the synthesis of a pattern generated by a procedural model with an auto brush control, according to one embodiment.

FIG. 6 is a flowchart of a method for controlling the synthesis of a pattern generated by a procedural model with an auto brush control, according to one embodiment. As indicated at 300, a pattern may be synthesized according to a procedural model along a specified curve from a specified start point of the curve to a specified end point of the curve. In one embodiment, input may be received from a cursor control device specifying the start point of the curve, the curve, and the end point of the curve. The curve may be specified by a movement of a cursor via the cursor control device from the start point to the end point. The curve may be an initial curve of a pattern being generated and thus may start at a seed point, or may be a secondary curve of a pattern being generated that starts at some point on a displayed pattern.

As indicated at 302, the synthesis of the pattern by the procedural model may be constrained along the curve to a region defined by a specified distance from the curve.

As indicated at 304, the synthesized pattern may be displayed to a display device. In one embodiment, the pattern is synthesized and displayed while the cursor is moved via the cursor control device to generate the curve.

FIG. 7 illustrates a pattern synthesis module according to one embodiment. Pattern synthesis module 400 may receive an input image 410 to be used as the working image 420. Alternatively, pattern synthesis module 400 may be used to generate a new image as working image 420. Direct brush tool 402 and/or auto brush tool 404 may be used to interactively generate a pattern or patterns on working image 420 under user control, as described above in relation to FIGS. 1A through 1C, FIG. 2, FIGS. 4A through 4D, FIG. 6, and FIG. 7. In one embodiment, an optional eraser tool 406 may be used to interactively erase parts of generated patterns under user control, as described above in relation to FIG. 4E. Output image 430 may, for example, be stored to a local or network storage medium 440, such as system memory, a local or network disk drive or other storage system, DVD, CD, etc.

Example System

Various components of embodiments of a pattern synthesis module may be executed on one or more computer systems, which may interact with various other devices. One such computer system is illustrated by FIG. 8. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for interactively controlling the synthesis of patterns using procedural models in computer graphics may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a pattern synthesis module implementing methods for interactively controlling the synthesis of patterns using procedural models in computer graphics, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 8, memory 720 may include program instructions 725, configured to implement embodiments of a pattern synthesis module and/or of one or more methods of interactively controlling the synthesis of patterns using procedural models in computer graphics as described herein, and data storage 735, comprising various data accessible by program instructions 725, for example one or more files containing scripts that implement one or more procedural models. In one embodiment, program instructions 725 may include software elements of a pattern synthesis module and/or of one or more methods of interactively controlling the synthesis of patterns using procedural models in computer graphics as illustrated in the above Figures. Data storage 735 may include data that may be used in embodiments, for example one or more files containing scripts that implement one or more procedural models. In other embodiments, other or different software elements and/or data may be included.

Those skilled in the art will appreciate that computer system 700 is merely illustrative and is not intended to limit the scope of a pattern synthesis module as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
obtaining an indication of a curve;
synthesizing at least one element of a pattern specified by a procedural model on the curve from a specified start point of the curve to a specified end point of the curve, wherein the procedural model is configured to synthesize one or more distinct elements according to a set of rules to generate the pattern, and wherein said synthesizing the at least one element of the pattern on the curve overrides at least one of the rules of the procedural model to directly place the at least one element of the pattern on the curve;
synthesizing one or more elements of the pattern along the synthesized at least one element on the curve according to the rules of the procedural model; and
displaying the synthesized elements.

2. The computer-implemented method as recited in claim 1, wherein the curve, the start point of the curve, and the end point of the curve are specified via a cursor control device.

3. The computer-implemented method as recited in claim 1, wherein said obtaining an indication of a curve comprises:
receiving input from a cursor control device specifying the start point of the curve;
receiving input from the cursor control device specifying the curve, wherein the curve is specified by a movement of a cursor via the cursor control device; and
receiving input from the cursor control device specifying the end point of the curve.

4. The computer-implemented method as recited in claim 3, wherein the elements are synthesized and displayed awhile the cursor is moved via the cursor control device to specify the curve.

5. The computer-implemented method as recited in claim 1, further comprising:

obtaining an indication of a second curve, wherein a start point of the second curve is on or adjacent to a synthesized element on or along the curve;

synthesizing the at least one element of the pattern specified by the procedural model on the second curve from the start point of the second curve to a specified end point of the second curve; and synthesizing the one or more elements of the pattern along the synthesized at least one element on the second curve according to the rules of the procedural model.

6. The computer-implemented method as recited in claim 1, further comprising:

obtaining an indication of a second curve and an indication of a specified distance, wherein a start point of the second curve is on or adjacent to a synthesized element on or along the curve, and wherein the specified distance defines a region around the second curve;

synthesizing the pattern according to the rules of the procedural model along the second curve from the start point of the second curve to at or near a specified end point of the second curve, wherein said synthesizing the pattern along the second curve is constrained to the region around the second curve defined by the specified distance.

7. The computer-implemented method as recited in claim 1, comprising:

receiving input from a cursor control device specifying a point on the curve; and erasing the displayed elements from the specified point on the curve to the end point of the curve.

8. A computer-implemented method, comprising:

obtaining an indication of a curve and an indication of a specified distance from the curve;

applying a procedural model to grow a pattern along the curve starting at a specified start point of the curve and continuing to at or near a specified end point of the curve, wherein the procedural model synthesizes one or more distinct elements of the pattern along the curve according to a set of rules to grow the pattern;

wherein said applying limits application of at least one rule of the set of rules according to the curve and the specified distance such that the growth of the pattern by the procedural model along the curve is constrained to a region defined by the specified distance from the curve; and displaying the synthesized pattern.

9. The computer-implemented method as recited in claim 8, wherein the curve, the start point of the curve, and the end point of the curve are specified via a cursor control device.

10. The computer-implemented method as recited in claim 8, wherein said obtaining an indication of a curve comprises:

receiving input from a cursor control device specifying the start point of the curve;

receiving input from the cursor control device specifying the curve, wherein the curve is specified by a movement of a cursor via the cursor control device; and receiving input from the cursor control device specifying the end point of the curve.

11. The computer-implemented method as recited in claim 10, wherein the pattern is synthesized and displayed along the curve while the cursor is moved via the cursor control device to specify the curve.

12. The computer-implemented method as recited in claim 8, further comprising:

obtaining an indication of a second curve, wherein a start point of the second curve is on or adjacent to a synthesized element within the region defined by the specified distance from the curve;

synthesizing at least one element of the pattern specified by the procedural model on the second curve from the start point of the second curve to a specified end point of the second curve; and synthesizing one or more elements of the pattern along the synthesized at least one element on the second curve according to the rules of the procedural model.

13. The computer-implemented method as recited in claim 8, further comprising:

obtaining an indication of a second curve and an indication of a specified distance from the second curve, wherein a start point of the second curve is on or adjacent to a synthesized element within the region defined by the specified distance from the curve;

applying the procedural model to grow the pattern along the second curve starting at the start point of the second curve and continuing to a specified end point of the second curve; and wherein the growth of the pattern by the procedural model along the second curve is constrained to a region defined by the specified distance from the second curve.

14. The computer-implemented method as recited in claim 8, comprising:

receiving input from a cursor control device specifying a point on the curve; and erasing the displayed pattern from the specified point on the curve to the end point of the curve.

15. A system, comprising:

at least one processor;

a display device; and a memory comprising program instructions, wherein the program instructions are executable by the at least one processor to:

obtain an indication of a curve;

synthesize at least one element of a pattern specified by a procedural model on the curve from a specified start point of the curve to a specified end point of the curve, wherein the procedural model is configured to synthesize one or more distinct elements according to a set of rules to generate the pattern, and wherein said synthesizing the at least one element of the pattern on the curve overrides at least one of the rules of the procedural model to directly place the at least one element of the pattern on the curve;

synthesize one or more elements of the pattern along the synthesized at least one element on the curve according to the rules of the procedural model; and display the synthesized elements to the display device.

16. The system as recited in claim 15, wherein the system further comprises a cursor control device, and wherein, to obtain an indication of a curve, the program instructions are executable by the at least one processor to:

receive input from the cursor control device specifying the start point of the curve;

receive input from the cursor control device specifying the curve, wherein the curve is specified by a movement of a cursor via the cursor control device; and receive input from the cursor control device specifying the end point of the curve.

17. The system as recited in claim 16, wherein the program instructions are executable by the at least one processor to synthesize and display the elements while the cursor is moved via the cursor control device to specify the curve.

18. The system as recited in claim 15, wherein the program instructions are executable by the at least one processor to:

obtain an indication of a second curve, wherein a start point of the second curve is on or adjacent to a synthesized element on or along the curve;

synthesize the at least one element of the pattern specified by the procedural model on the second curve from the start point of the second curve to a specified end point of the second curve; and synthesize the one or more elements of the pattern along the synthesized at least one element on the second curve according to the rules of the procedural model.

19. The system as recited in claim 15, wherein the program instructions are executable by the at least one processor to:

obtain an indication of a second curve and an indication of a specified distance, wherein a start point of the second curve is on or adjacent to a synthesized element on or along the curve, and wherein the specified distance defines a region around the second curve;

synthesize the pattern according to the rules of the procedural model along the second curve from the start point of the second curve to at or near a specified end point of the second curve, wherein said synthesizing the pattern along the second curve is constrained to the region around the second curve defined by the specified distance.

20. The system as recited in claim 15, wherein the system further comprises a cursor control device, and wherein the program instructions are executable by the at least one processor to:

receive input from the cursor control device specifying a point on the curve; and erase the displayed elements from the specified point on the curve to the end point of the curve.

21. A system, comprising:

at least one processor;

a display device; and a memory comprising program instructions, wherein the program instructions are executable by the at least one processor to:

obtain an indication of a curve and an indication of a specified distance from the curve;

apply a procedural model to grow a pattern along the curve starting at a specified start point of the curve and continuing to at or near a specified end point of the curve, wherein the procedural model synthesizes one or more distinct elements of the pattern along the curve according to a set of rules to grow the pattern;

wherein said applying limits application of at least one rule of the set of rules according to the curve and the specified distance such that the growth of the pattern by the procedural model along the curve is constrained to a region defined by the specified distance from the curve; and display the synthesized pattern to the display device.

22. The system as recited in claim 21, wherein the system further comprises a cursor control device, and wherein, to obtain an indication of a curve, the program instructions are executable by the at least one processor to:

receive input from the cursor control device specifying the start point of the curve;

receive input from the cursor control device specifying the curve, wherein the curve is specified by a movement of a cursor via the cursor control device; and receive input from the cursor control device specifying the end point of the curve.

23. The system as recited in claim 22, wherein the program instructions are executable by the at least one processor to synthesize and display the pattern along the curve while the cursor is moved via the cursor control device to specify the curve.

24. The system as recited in claim 21, wherein the program instructions are executable by the at least one processor to:

obtain an indication of a second curve, wherein a start point of the second curve is on or adjacent to a synthesized element within the region defined by the specified distance from the curve;

synthesize at least one element of the pattern specified by the procedural model on the specified second curve from the start point of the second curve to a specified end point of the second curve; and synthesize one or more elements of the pattern along the synthesized at least one element on the second curve according to the rules of the procedural model.

25. The system as recited in claim 21, wherein the program instructions are executable by the at least one processor to:

obtain an indication of a second curve and an indication of a specified distance from the second curve, wherein a start point of the second curve is on or adjacent to a synthesized element within the region defined by the specified distance from the curve;

applying the procedural model to grow the pattern along the second curve starting at the start point of the second curve and continuing to a specified end point of the second curve; and wherein the growth of the pattern by the procedural model along the second curve is constrained to a region defined by the specified distance from the second curve.

26. The system as recited in claim 21, wherein the system further comprises a cursor control device, and wherein the program instructions are executable by the at least one processor to:

receive input from the cursor control device specifying a point on the curve; and erase the displayed pattern from the specified point on the curve to the end point of the curve.

27. A non-transitory computer-readable storage medium storing program instructions, wherein the program instructions are computer-executable to implement a pattern synthesis module configured to:

obtain an indication of a curve;

synthesize at least one element of a pattern specified by a procedural model on the curve from a specified start point of the curve to a specified end point of the curve, wherein the procedural model is configured to synthesize one or more distinct elements according to a set of rules to generate the pattern, and wherein said synthesizing the at least one element of the pattern on the curve overrides at least one of the rules of the procedural model to directly place the at least one element of the pattern on the curve;

synthesize one or more elements of the pattern along the synthesized at least one element on the curve according to the rules of the procedural model; and display the synthesized elements to the display device.

28. The non-transitory computer-readable storage medium as recited in claim 27, wherein, to obtain an indication of a curve, the pattern synthesis module is configured to:

receive input from a cursor control device specifying the start point of the curve;

receive input from the cursor control device specifying the curve, wherein the curve is specified by a movement of a cursor via the cursor control device; and receive input from the cursor control device specifying the end point of the curve.

29. The non-transitory computer-readable storage medium as recited in claim 28, wherein the pattern synthesis module is configured to synthesize and display the elements while the cursor is moved via the cursor control device to specify the curve.

30. The non-transitory computer-readable storage medium as recited in claim 27, wherein the pattern synthesis module is configured to:
obtain an indication of a second curve, wherein a start point of the second curve is on or adjacent to a synthesized element on or along the curve;
synthesize the at least one element of the pattern specified by the procedural model on the second curve from the start point of the second curve to a specified end point of the second curve; and
synthesize the one or more elements of the pattern along the synthesized at least one element on the second curve according to the rules of the procedural model.

31. The non-transitory computer-readable storage medium as recited in claim 27, wherein the pattern synthesis module is configured to:
obtain an indication of a second curve and an indication of a specified distance, wherein a start point of the second curve is on or adjacent to a synthesized element on or along the curve, and wherein the specified distance defines a region around the second curve;
synthesize the pattern according to the rules of the procedural model along the second curve from the start point of the second curve to at or near a specified end point of the second curve, wherein said synthesizing the pattern along the second curve is constrained to the region around the second curve defined by the specified distance.

32. The non-transitory computer-readable storage medium as recited in claim 27, wherein the pattern synthesis module is configured to:
receive input from a cursor control device specifying a point on the curve; and
erase the displayed elements from the specified point on the curve to the end point of the curve.

33. A non-transitory computer-readable storage medium storing program instructions, wherein the program instructions are computer-executable to implement a pattern synthesis module configured to:
obtain an indication of a curve and an indication of a specified distance from the curve;
apply a procedural model to grow a pattern along the curve starting at a specified start point of the curve and continuing to at or near a specified end point of the curve, wherein the procedural model synthesizes one or more distinct elements of the pattern along the curve according to a set of rules to grow the pattern;
wherein said applying limits application of at least one rule of the set of rules according to the curve and the specified distance such that the growth of the pattern by the procedural model along the curve is constrained to a region defined by the specified distance from the curve; and
display the synthesized pattern to the display device.

34. The non-transitory computer-readable storage medium as recited in claim 33, wherein, to obtain an indication of a curve, the pattern synthesis module is configured to:
receive input from a cursor control device specifying the start point of the curve;
receive input from the cursor control device specifying the curve, wherein the curve is specified by a movement of a cursor via the cursor control device; and
receive input from the cursor control device specifying the end point of the curve.

35. The non-transitory computer-readable storage medium as recited in claim 34, wherein the pattern synthesis module is configured to synthesize and display the pattern along the curve while the cursor is moved via the cursor control device to specify the curve.

36. The non-transitory computer-readable storage medium as recited in claim 33, wherein the pattern synthesis module is configured to:
obtain an indication of a second curve, wherein a start point of the second curve is on or adjacent to a synthesized element within the region defined by the specified distance from the curve;
synthesize at least one element of the pattern specified by the procedural model on the specified second curve from the start point of the second curve to a specified end point of the second curve; and
synthesize one or more elements of the pattern along the synthesized at least one element on the second curve according to the rules of the procedural model.

37. The non-transitory computer-readable storage medium as recited in claim 33, wherein the pattern synthesis module is configured to:
obtain an indication of a second curve and an indication of a specified distance from the second curve, wherein a start point of the second curve is on or adjacent to a synthesized element within the region defined by the specified distance from the curve;
applying the procedural model to grow the pattern along the second curve starting at the start point of the second curve and continuing to a specified end point of the second curve; and
wherein the growth of the pattern by the procedural model along the second curve is constrained to a region defined by the specified distance from the second curve.

38. The non-transitory computer-readable storage medium as recited in claim 33, wherein the pattern synthesis module is configured to:
receive input from a cursor control device specifying a point on the curve; and
erase the displayed pattern from the specified point on the curve to the end point of the curve.

39. A computer-implemented method, comprising:
executing instructions on a specific apparatus so that binary digital electronic signals representing a curve are obtained;
executing instructions on the specific apparatus so that binary digital electronic signals representing at least one element of a pattern specified by a procedural model are synthesized on the curve from a specified start point of the curve to a specified end point of the curve, wherein the procedural model is configured to synthesize one or more distinct elements according to a set of rules to generate the pattern, and wherein said synthesizing the at least one element of the pattern on the curve overrides at least one of the rules of the procedural model to directly place the at least one element of the pattern on the curve;
executing instructions on said specific apparatus so that binary digital electronic signals representing one or more elements of the pattern are synthesized along the synthesized at least one element on the curve according to the rules of the procedural model; and
storing the synthesized elements in a memory location of said specific apparatus.

40. A computer-implemented method, comprising:
- executing instructions on a specific apparatus so that binary digital electronic signals representing a curve and an indication of a specified distance from the curve are obtained;
- executing instructions on the specific apparatus so that binary digital electronic signals representing a procedural model are applied to grow a pattern along the curve starting at a specified start point of the curve and continuing to at or near a specified end point of the curve, wherein the procedural model synthesizes one or more distinct elements of the pattern along the curve according to a set of rules to grow the pattern;
- executing instructions on said specific apparatus said applying limits application of at least one rule of the set of rules according to the curve and the specified distance such that growth of the binary digital electronic signals representing the pattern by the procedural model is constrained to a region defined by the specified distance from the curve; and
- storing the synthesized pattern in a memory location of said specific apparatus.

\* \* \* \* \*